US008716905B2

(12) United States Patent
Rogne

(10) Patent No.: US 8,716,905 B2
(45) Date of Patent: May 6, 2014

(54) ELECTRONIC DC CIRCUIT BREAKER

(75) Inventor: Terje Rogne, Trondheim (NO)

(73) Assignee: Wartsila Norway AS, Rubbestadneset (NO)

( * ) Notice: Subject to any disclaimer, the term of this patent is extended or adjusted under 35 U.S.C. 154(b) by 800 days.

(21) Appl. No.: 12/918,214

(22) PCT Filed: Feb. 19, 2009

(86) PCT No.: PCT/NO2009/000057
§ 371 (c)(1),
(2), (4) Date: Oct. 13, 2010

(87) PCT Pub. No.: WO2009/104971
PCT Pub. Date: Aug. 27, 2009

(65) Prior Publication Data
US 2011/0025400 A1  Feb. 3, 2011

(30) Foreign Application Priority Data

Feb. 19, 2008  (NO) .................................. 20080843

(51) Int. Cl.
*H01H 47/00* (2006.01)
(52) U.S. Cl.
USPC ........................................... 307/125
(58) Field of Classification Search
USPC ........................................... 37/125; 307/125
See application file for complete search history.

(56) References Cited

U.S. PATENT DOCUMENTS

| 5,708,579 A | * | 1/1998 | Donegan et al. | 363/124 |
| 6,060,795 A | * | 5/2000 | Azotea et al. | 307/150 |
| 6,160,689 A | * | 12/2000 | Stolzenberg | 361/58 |
| 6,323,717 B1 | * | 11/2001 | Omura et al. | 327/434 |
| 6,738,246 B1 | | 5/2004 | Strumpler | |
| 7,279,853 B2 | * | 10/2007 | Chong | 315/307 |
| 2002/0030532 A1 | | 3/2002 | Majumdar et al. | |

(Continued)

FOREIGN PATENT DOCUMENTS

| DE | 4108049 A1 | 9/1992 |
| DE | 19955682 A1 | 6/2001 |

(Continued)

OTHER PUBLICATIONS

Krstic, Slobodan, at al., "Circuit Breaker Technologies for Advanced Ship Power Systems", Electric Ship Technologies Symposium 2007, ESTS apos;07, IEEE May 21-23, 2007, pp. 201-208.

(Continued)

*Primary Examiner* — Jared Fureman
*Assistant Examiner* — Duc M Pham
(74) *Attorney, Agent, or Firm* — Winstead PC

(57) ABSTRACT

The present invention relates to a device for connecting and breaking DC power comprising an input DC power (DC-In) arranged to be connected to a circuit board (1) and to the collector port (C) of an insulated gate bipolar transistor (IGBT). The insulated gate bipolar transistor (IGBT) is arranged to be connected to the circuit board (1). An output DC power (DC-Out) is arranged to be connected to the emitter port (E) of the insulated gate bipolar transistor (IGBT) and the circuit board (1). The circuit board (1) is arranged to be connected to the gate port (G) of the insulated gate bipolar transistor (IGBT) and the circuit board (1) is designed to monitor predetermined conditions of the input and output DC power (DC-In, DC-Out).

15 Claims, 1 Drawing Sheet

(56) References Cited

U.S. PATENT DOCUMENTS

| | | |
|---|---|---|
| 2002/0162033 A1 | 10/2002 | Maxwell et al. |
| 2003/0192881 A1* | 10/2003 | Bassill et al. ................. 219/626 |
| 2004/0160128 A1* | 8/2004 | Athari ............................ 307/44 |
| 2005/0002152 A1 | 1/2005 | Gemme et al. |
| 2007/0189675 A1* | 8/2007 | Nagatsuka ...................... 385/88 |
| 2009/0184760 A1* | 7/2009 | Hauenstein ................... 327/594 |

FOREIGN PATENT DOCUMENTS

| | | |
|---|---|---|
| EP | 0867998 A1 | 9/1998 |
| EP | 1811665 A2 | 7/2007 |
| JP | 2000 236622 A | 8/2000 |
| WO | WO-2007/020539 A1 | 2/2007 |
| WO | WO-2007/022744 A1 | 3/2007 |

OTHER PUBLICATIONS

Colombo, Alessandro, "International Search Report", for PCT/NO2009/000057 as mailed May 19, 2009, 3 pages.

Walker, Geoff, "A DC Circuit Breaker for an Electric Vehicle Battery Pack", Dept. of Computer Science and Electrical Engineering, University of Queensland, Australia, 6 pages.

\* cited by examiner

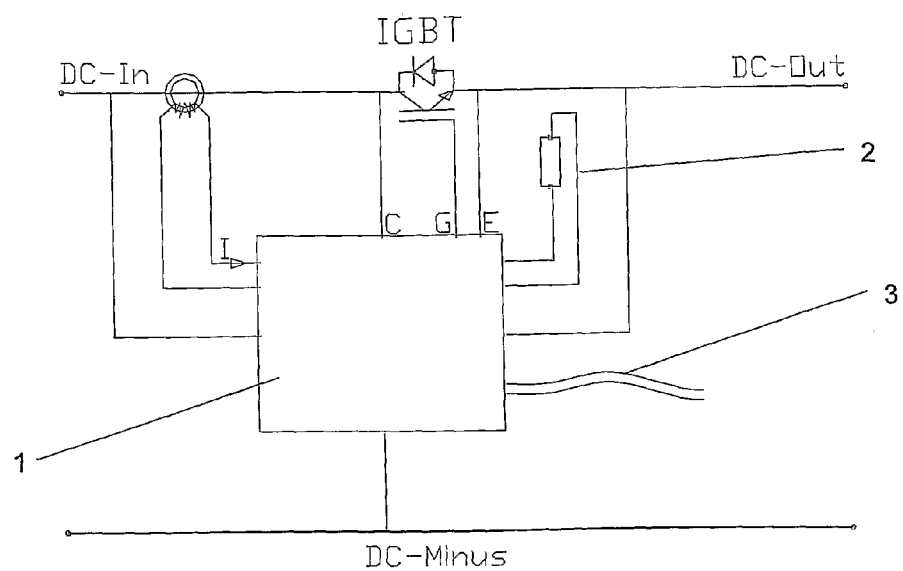

ELECTRONIC DC CIRCUIT BREAKER

FIELD OF THE INVENTION

This invention relates generally to a device for connecting and breaking DC power, and for acting as a fast fuse.

More particularly this invention relates to an electric DC circuit breaker (E-DCB) that comprises a high power insulated gate bipolar transistor (IGBT transistor) that is used for connecting and breaking DC power, and to act as an extremely fast acting fuse. The invention is primarily intended to be used on drilling rigs with several motor drives on a common DC-link.

BACKGROUND OF THE INVENTION AND RELATED ART

Circuit breakers that are designed to break DC are commercially available. These commercial DC circuit breakers are typically designed to handle a maximum power limit at approximately 1.5 kW. Some of these use mechanical components and some are only intended for use in small applications, such as house hold electronics. Another group of commercial DC circuit breakers use explosives to break the circuit, which introduces the need of component replacement and maintenance.

The patent application U.S. Pat. No. 6,738,246 B1 discloses an electrical circuit breaker for protection against small and large over-currents. This invention operates in the voltage range 100V-1 kV. A micro relay switch is used in conjunction with a component for short-circuit current limiting. The micro relay switch is a mechanical switch and switches off small over-currents, and the component for short-circuit current limiting switches off very large over-currents. The use of the component for short-circuit current limiting destroys the micro relay switch.

The patent application WO 2007/022744 A1 discloses a current limiting switch that contains a mechanical switching unit.

WO 2007/020539 provides a current limiter circuit configuration for a battery charging circuit. This circuit configuration rapidly detects and limits any current variation through a gate-controlled switching device. The invention is intended to be used in portable and mobile devices.

DE 199 55 682 A1 discloses a current limiting device for high voltages. This invention uses explosives to open a current path. The use of explosives implies the need to replace components to regain operation of the device, and maintenance of the system. Maintenance takes time and requires spare parts. During maintenance time the system can not fully operate.

US 2005/0002152 A1 discloses a fault current limiting system and method that is based on the use of a combined fast switch and an electrical fuse in parallel. After a fault is detected the fast switch opens in a very short time and transfers the current to the fuse, which is able to blow out, thereby interrupting the short-circuit current. An automatic system takes care of replacing the blown-out fuse set with a new one. An explosive based cartridge can be used instead of a fast switch.

The publication "A DC Circuit Breaker for an Electric Vehicle Battery Pack" by G. Walker discloses a static DC circuit breaker that uses a MOSFET. This solution handles voltages in the range of hundreds of volts.

Examples of other known solutions are DE 4 108 049 which discusses a protection system for AC systems and thus is not suitable for the DC applications. US 2002/0030532 illustrates a solution avoiding failures caused by heat in a semiconductor switch having an IGBT mounted on a circuit board, as is well known in the art. EP 1 811 665 discusses a gate controlled switch and the article by Krstic, S et al; "circuit breaker technology for advanced ship power systems", Electric ship technologies Symposium 2007, ESTS apos; 07. IEEE 21-23 May 2007, Pages 201-208 which discusses a fast circuit switches based on IGBT and IGCT for use in ships.

OBJECTIVE OF THE INVENTION

It is an object of the present invention to provide an electronic device that is used for connecting and breaking DC power. The present invention is based on the problem of finding an improved electronic DC circuit breaker that can handle large voltages, act as a fast fuse, be used on drilling rigs, ship motor drives and industrial plants and that does not need to replace parts to be able to regain operation after breaking the power.

The above mentioned objects of this invention are obtained as described in the accompanying claims.

SUMMARY OF THE INVENTION

The above mentioned objects are solved by the present invention that discloses a device, named E-DCB for short (Electronic DC Breaker), which handles high power during an insulated gate bipolar transistor (IGBT transistor). The device acts as an extremely fast acting fuse so that no other transistors on the same DC-distribution are influenced on an internal short-circuit in one transistor. And the device, according to the present solution, has no need for replacement or maintenance of components, and is primarily intended to be used on relatively large applications, like drilling rigs with several motor drives on a common DC-link, motor drives on ships or industrial plants with several motor drives on the same DC-distribution.

In a preferred embodiment of the invention a device is provided for connecting and breaking DC power comprising an input DC power arranged to be connected to a circuit board and to the collector port of an insulated gate bipolar transistor. The insulated gate bipolar transistor is arranged to be connected to the circuit board. An output DC power is arranged to be connected to the emitter port of the insulated gate bipolar transistor and the circuit board. The circuit board is arranged to be connected to the gate port of the insulated gate bipolar transistor, and the circuit board is designed to monitor predetermined conditions of the input and output DC power.

In yet a preferred embodiment of the device according to the invention, signal transfer means are connected to the circuit board and arranged to transmit control commands to the device.

In a preferred embodiment of the device according to the present invention, the signal transfer means are optical fibres. Optical fibres, in their nature, provide a very safe connection.

In a further preferred embodiment of the device according to the invention the signal transfer means are opto couplers.

In yet a preferred embodiment of the device according to the invention the signal transfer means has galvanic isolation.

In still a preferred embodiment of the device according to the invention, temperature measuring means is connected to the circuit board for measuring heat sink temperature. If the measured heat sing temperature exceeds a given limit, the device is turned off.

In a preferred embodiment of the device according to the present invention said control commands are either on or off.

In yet a preferred embodiment of the invention the device is arranged to isolate a failure in a converter on a common DC-distribution before neighbour converters are disturbed.

In still a preferred embodiment of the present invention, the device is arranged to send measurements to the signal transfer means.

In a preferred embodiment of the invention the measurements are incoming DC-voltage, DC-In, outgoing DC-voltage, DC-Out, current, $I_{E\text{-}DCB}$ and heat sink temperature. If these measured variables exceed a predetermined value, the device is turned off.

In further a preferred embodiment of the present invention the device is arranged to handle high power, such as 1.5 Mega Watts. This high power provides a use in large applications.

In a preferred embodiment of the present invention the device is arranged to be used in large application, such as drilling rigs, motor drives on ships or industrial plants.

In yet a preferred embodiment of the present invention the device is arranged to control one DC-capacitor battery towards the DC-distribution.

BRIEF DESCRIPTION OF THE DRAWINGS

The drawings will now be further described in more detail in the following detailed description by reference to the appended drawing.

FIG. 1 illustrates the structure of the electric DC breaker (E-DCB).

DETAILED DESCRIPTION OF PREFERRED EMBODIMENTS

Referring to FIG. 1, the task of the E-DCB is to connect and disconnect DC-Out to DC-In according to received control signals.

FIG. 1 shows the E-DCB, which comprises an insulated gate bipolar transistor (IGBT) used for connecting and breaking DC power, and that acts as an extremely fast acting fuse. The principles of an IGBT transistor are known for a person skilled in the art.

As seen in FIG. 1, input DC-power DC-In is connected to a circuit board 1 and the collector port C of an IGBT. An output DC power DC-Out is connected to the emitter port E of the IGBT and the circuit board 1. The circuit board 1 is connected to the gate port G of IGBT, and the circuit board 1 monitors predetermined conditions of the input and output DC power DC-In, DC-Out. A temperature measurement device 2, measuring heat sink temperature, is also connected to the circuit board 2.

Internal DC-DC-converters on the circuit board 1 in the E-DCB converts the high DC-voltage, DC-In, to necessary internal voltages for the electronics. There is no need for extra power supply to perform this conversion. The circuit board 1 measures the incoming DC-voltage, DC-In, the outgoing DC-voltage, DC-Out, the current, $I_{E\text{-}DCB}$, and the temperature measurement device 2 measures the heat sink temperature.

The circuit board 1 has a pair of optical fibres 3 connected to it, through which the E-DCB is controlled. Optical fibres provide, in their nature, a very safe connection. These optical fibres 3 are in the other end connected to a main control board, not shown, where On/Off commands are given and sent to the E-DCB and status can be read. Optical fibres 3 are used to control the E-DCB because it provides a very safe connection. No other connections than the optical fibres 3 are necessary. It is also possible to use e.g. opto couplers or any signal transfer means with galvanic isolation instead of optical fibres 3. Opto couplers can be used in any case except when they do not fulfil the isolation requirements. The optical fibres 3 transmit control commands from the main control board to the E-DCB, and the E-DCB continuously sends measurements (incoming DC-voltage, DC-In, the outgoing DC-voltage, DC-Out, the current, $I_{E\text{-}DCB}$, heat sink temperature and utilization factor (dynamic thermal model)) and status signal (E-DCB on or off) in return to the main control board through the optical fibres 3. The signal that is transmitted through the optical fibres 3 to the E-DCB is either the status signal On or the status signal Off.

When the optical fibres 3 transmit an On-command to the E-DCB, the load capacitor in the circuit board is charged through pulsing the E-DCB with short current controlled on-intervals, until one on-interval lasts more than 10 microseconds without having reached its current limit (e.g. 3500 A)—then the E-DCB is reported on. If the E-DCB does not reach the acceptance criteria (no current limit reached through 10 microseconds registered by a timer device) within 2 seconds, the charge phase is terminated and a failure report is returned to the control board.

When the E-DCB is on, it monitors various variables. The E-DCB is turned off if the following examples of limits for the variables are exceeded:
  if the monitored current is above 3500 A for more than 10 microseconds,
  if the monitored current is above 2500 A for more than 2 minutes, that is, utilization factor is above 103%,
  if the monitored heat sink temperature is above 60° C.

The above mentioned limits are only an example of limits for turning off the E-DCB. It will be obvious for a person skilled in the art that these limits can be adjusted.

Whenever the E-DCB is turned off due to any of the above mentioned criteria, it stays off for 300 milliseconds. When the E-DCB receives an Off-command from the optical fibres 3 it is immediately turned off. To turn the E-DCB on again, the Off-command must be removed and a new On-command must be received after the 300 milliseconds.

If a full short-circuit in the load is detected, the E-DCB interrupts the current within 30 microseconds. Accordingly, other DC capacitor batteries with their power electronic converters only see a dip in the DC-voltage of less than approximately 50V, that is, they are not at all disturbed by the short-circuit in their faulty neighbour capacitor battery, and continue operation uninterrupted.

The E-DCB needs a minimum of approximately 400V to operate (a lower voltage sets the E-DCB in disconnect mode). The maximum continuous voltage is approximately 1250V, and the maximum peak voltage is approximately 1600V for 100 microseconds. These specification voltages are DC-In and DC-Out versus DC minus. These values can be adjusted by selecting different IGBT's and current sensors with suitable sizes, for example by using more high voltage IGBT's and adapted circuit boards, the mentioned voltage values can be extended.

In contrast to the traditional electronic circuit breakers that use mechanical breakers, the circuit breaker according to the present invention uses electronic breakers. An IGBT used together with electronics form the E-DCB. An advantage of the IGBT that makes it useful in the electronic breaker is it possibility to manage very high values of power, typically 1.5 Mega Watts. The IGBT is capable of managing very high values of power due to its inner structure which allows much higher voltage classes with still low conduction loss. In comparison, a MOSFET transistor can only manage powers around 1.5 kilo Watts because its conductive resistance has a quadratic increase with increasing voltage class. The IGBT is able to use its over-current and over-voltage capability in a positive way that provides advantages over other transistors. The present invention uses the IGBT in a way that the transistor protects itself against over-voltage. Because the IGBT, and thus the E-DCB, can handle a very high voltage, the industrial application is much broader than by using e.g. a MOSFET or other similar transistors. The industrial application can be for large applications like drilling rigs, motor drives on ships etc.

Another advantage of the E-DCB is the high speed of the fuse action. The function as a high speed fuse is provided by the nature of the IGBT. Passive fuses acts typically within minimum 10-100 milliseconds, but the fast acting E-DCB fuse has a speed in the order of microseconds. The extremely fast acting fuse according to the present invention provide for that no other transistors on the same DC-distribution are influenced on an internal short-circuit in one transistor. This very large gap in speed, from milliseconds to microseconds, implies that the E-DCB fuse according to the present invention reacts so much faster than e.g. a passive fuse that it has completely different possibilities and applications.

Isolation of the E-DCB with respect to the signals is handled through opto fibre or other types of signal isolation. Standard internal ceramic isolation is used in the IGBT to isolate against the heat sink. Power loss is directed away in the heat sink, on which the IGBT is mounted. The temperature of this heat sink is measured by the temperature measurement device 2. Loss that needs to be cooled away in the heat sink is approximately 2‰ of the effect flowing through the E-DCB.

The E-DCB requires a separate measuring card and control card in addition to water or an air cooled heat sink. The weight and physical volume of the E-DCB is moderate, and the cost of the E-DCB is relatively small or moderate.

It is easy to adjust the E-DCB to different currents and adjusting the limits for turning the E-DCB on and off. This is easily done by selecting IGBT's and current sensors with suitable sizes.

A typical application for the E-DCB is in voltage fed power electronic converters with distributed DC capacitors, where the E-DCB controls each separate DC-capacitor battery towards the DC-distribution, that is, one E-DCB per DC-capacitor battery. Each separate DC-capacitor battery is typically a part of a separate power electronic converter around this capacitor.

According to the present invention, the E-DCB is primarily intended to be used on drilling rigs with several motor drives on a common DC-link.

The present invention is also intended to be used on motor drives on ships. Thrusters and main propulsion from the same DC-distribution is connected with the E-DCB to protect the main propulsion from failures in the thrusters drives.

Another application for the E-DCB is on industrial plants that has several motor drives on the same DC-distribution, with uninterrupted operation on the remaining drives in the case of failure in one of the drives (equivalent to the above mentioned ship application).

Summarized, the E-DCB connects, with an initial charge phase, the distributed DC-capacitor to the DC-link, conducts the necessary load current, and interrupts the load current if it exceeds specified limits. The E-DCB interrupts a full load short-circuit without being damaged and without the need for replacing any parts to regain operation.

The invention claimed is:

1. A three wire device for connecting and breaking DC power comprising:
    an input DC power (DC-In) arranged to be connected to a circuit board and to a collector port (C) of an insulated gate bipolar transistor (IGBT);
    wherein the insulated gate bipolar transistor (IGBT) is arranged to be connected to the circuit board;
    an output DC power (DC-Out) is arranged to be connected to an emitter port (E) of the insulated gate bipolar transistor (IGBT) and the circuit board;
    wherein the circuit board is arranged to be connected to a gate port (G) of the insulated gate bipolar transistor (IGBT);
    wherein the circuit board is designed to monitor predetermined conditions of the input and output DC power (DC-In, DC-Out);
    an internal DC-DC converter provided by the circuit board, wherein the internal DC-DC converter coverts high DC voltage to internal voltages;
    wherein the three wire device reconnects a load in accordance with an on signal received by the circuit board; and
    a DC minus line coupled to the circuit board.

2. The device according to claim 1, wherein signal transfer means are connected to the circuit board and arranged to transmit control commands to the device.

3. The device according to claim 2, wherein the signal transfer means are optical fibres.

4. The device according to claim 2, wherein the signal transfer means are opto couplers.

5. The device according to claim 2, wherein the signal transfer means have galvanic isolation.

6. The device according to claim 1, wherein means for measuring temperature is connected to the circuit board for measuring heat sink temperature.

7. The device according to claim 2, wherein said control commands are either on or off.

8. The device according to claim 1, wherein the device is arranged to handle high power.

9. The device according to claim 1, wherein the device is arranged to be used in large application.

10. The device according to claim 1, wherein the device is arranged to control one DC-capacitor battery towards a DC-distribution.

11. The three wire device according to claim 1 comprising:
    wherein the device is arranged to isolate a failure in a converter on a common DC-distribution before neighbour converters are disturbed.

12. The three wire device according to claim 1 comprising:
    wherein the device is arranged to send measurements to a signal transfer means.

13. The device according to claim 12, wherein the measurements are incoming DC-voltage, DC-In, outgoing DC-voltage, DC-Out, current, $I_{E\text{-}DCB}$ and heat sink temperature.

14. The device according to claim 8, wherein the high power is 1.5 MW.

15. The device according to claim 9, wherein the large application comprises at least one of drilling rigs, motor drives on ships, and industrial plants.

* * * * *

UNITED STATES PATENT AND TRADEMARK OFFICE
CERTIFICATE OF CORRECTION

PATENT NO. : 8,716,905 B2
APPLICATION NO. : 12/918214
DATED : May 6, 2014
INVENTOR(S) : Terje Rogne Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Twenty-ninth Day of September, 2015

Michelle K. Lee
*Director of the United States Patent and Trademark Office*